H. N. SHAW

April 12, 1932. Re. 18,420

ELECTRIC FURNACE

Original Filed Sept. 3, 1925 3 Sheets-Sheet 1

Inventor
H. N. Shaw
by John J. Kane
Attorney

H. N. SHAW

April 12, 1932. Re. 18,420

ELECTRIC FURNACE

Original Filed Sept. 3, 1925 3 Sheets-Sheet 2

Inventor
H. N. Shaw
by John J. Kane
Attorney

H. N. SHAW

April 12, 1932. Re. 18,420

ELECTRIC FURNACE

Original Filed Sept. 3, 1925 3 Sheets-Sheet 3

Inventor
H. N. Shaw
by John J. Kane
Attorney

Reissued Apr. 12, 1932

Re. 18,420

UNITED STATES PATENT OFFICE

HAROLD N. SHAW, OF LLANERCH, PENNSYLVANIA, ASSIGNOR, BY MESNE ASSIGNMENTS, TO GLOBAR CORPORATION, OF NIAGARA FALLS, NEW YORK, A CORPORATION OF NEW YORK

ELECTRIC FURNACE

Original No. 1,742,286, dated January 7, 1930, Serial No. 54,192, filed September 3, 1925. Application for reissue filed July 11, 1931. Serial No. 550,260.

This invention relates in general to electrical heating apparatus, and it has more particular relation to electrically heated furnaces of the resistance type adapted for producing and maintaining relatively high operating temperatures.

In the production of high temperatures by electrical resistance heating, as in the case of electrical furnaces and the like for the various commercial heat treatment processes, it has been considerable of a problem to secure an electrical resistance heating unit capable of producing the desired heat and still capable of maintaining itself under these high temperatures without undue deterioration, during a satisfactory commercial life, and readily renewable with little or no reconstruction of the furnace or placing of the latter out of commission from the standpoint of production.

A considerable part of the difficulty has existed with respect to the connection or mounting, from both an electrical and a mechanical standpoint, of the active or heat-producing portion of the resistance heating element, being due to a considerable extent to the fact that the difference in coefficients of expansion between the resistance heating element and mechanical and electrical mountings and connections therefor, caused separation of the metallic securing and terminal means from the resistance heating element, with consequent deterioration of the mounting, when the heating element operated at high temperatures. Further, these high operating temperatures cause oxidation and scaling or pitting of the metallic terminal and mounting means, with further consequent deterioration of the contact engagement between the resistance element and its terminal, this deterioration increasing at a very rapid rate after having been once started, with the consequent result that the voltage across the active heat-producing portion of the heating element, and consequently the useful heat produced, are greatly reduced. These various effects contribute to and appear to multiply in causing reduced and generally unsatisfactory commercial life of the heating element and its mounting.

The present invention includes and contemplates the provision of an improved electrically heated furnace especially adapted for commercially satisfactory high temperature operation, and wherein the heating effects are produced by resistance heating elements. Also the invention includes the provision of an improved form of resistance heating unit wherein a self-sustaining heating element is utilized in connection with an improved form of mechanical and electrical mounting therefor, and wherein the parts may be readily renewable with a minimum of shut-down and reconstruction of the furnace. The invention more particularly contemplates the utilization of molded and self-sustaining heating elements having terminal portions of substantially reduced resistance, and consequently reduced heat-producing capabilities, in connection with terminal mountings for the heating elements which serve to yieldingly mechanically support the heating elements in desired operative position and electrically connect the same in circuit in a readily demountable manner and substantially wholly through pressure exerted through butt-end contact with the terminal portions of the heating elements.

It is an object of the present invention to provide an improved form of electrical heating apparatus embodying a resistance heating unit of improved design and characteristics, and adapted for the production of relatively high operating temperatures with commercially satisfactory life and under conditions involving commercially reasonable expense for maintenance and renewal.

It is a further object of this invention to provide apparatus of this general class for operation as an electrical furnace and wherein the resistance heating element is of a relatively rigid, self-sustaining character and is yieldingly and detachably mounted in operative position substantially through butt-end engagement between terminal portions of the heating element and cooperative mounting terminals.

It is a further object of this invention to provide electrically heated furnace apparatus of the resistance type wherein the resistance heating element is of a self-sustaining character and essentially constituted of a carbonaceous material, and the body portion of the heating element is disposed in the active heating portion of the furnace with terminal portions of the heating element of increased conductivity disposed out of the active furnace chamber and in such association with metallic terminal elements as to provide efficient detachable mounting of the heating element in mechanically and electrically operative position.

Other objects of this invention are the provision and utilization in electrical heating apparatus of this general class, of heating elements in the form of molded and heat-hardened, rod-shaped bodies essentially constituted of silicon carbide and of substantially the same cross-sectional area throughout and having integrally formed terminal portions of increased conductivity and yieldably and detachably mounted in electrically and mechanically operative position through butt-end engagement with conductive terminal elements embodying materials of graded heat resistant properties and protected from the intense heat of the body portion of the heating element.

Figure 1:
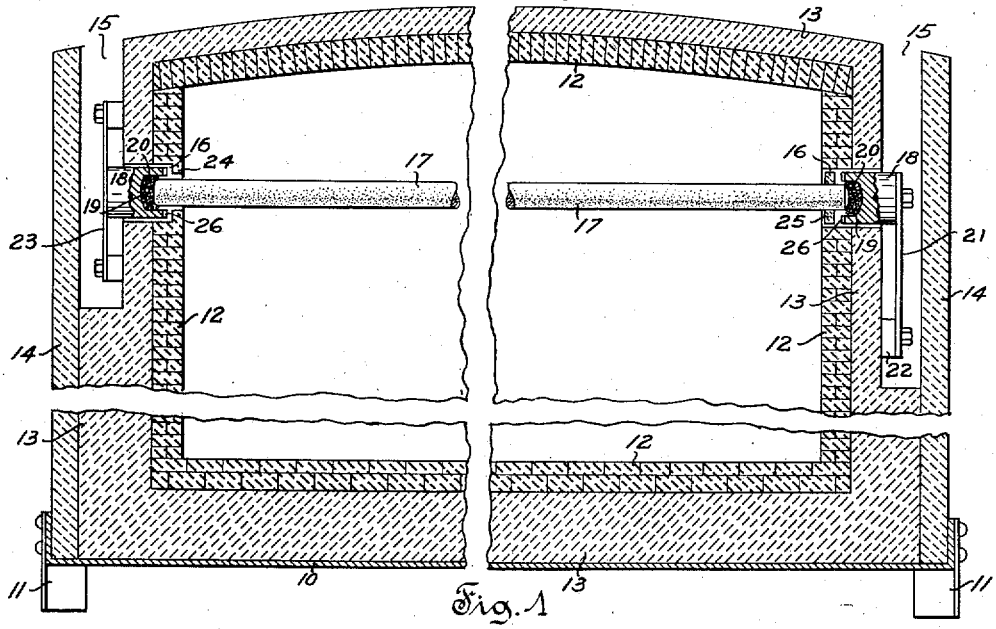
Fig. 1 is a vertical section of an electrically heated furnace of the resistance type, embodying features of the present invention.

In the embodiment of the invention disclosed in Fig. 1, an electrical furnace is shown as including a metal supporting frame 10 mounted upon supporting legs 11, this frame carrying the walls of an ordinary furnace chamber of refractory material, shown as having a dome-shaped roof and including a brick lining, indicated at 12, and a wall covering 13 of suitable refractory or heat insulating material and an enclosing wall covering 14 of suitable heat insulating material, there being an air space 15 between upper portions of the sides of the coverings 13 and 14. The side walls of the refractory chamber and the covering wall 13 are provided with through alined apertures 16, indicated as being fairly near the dome-shaped roof of the furnace chamber. One or any desired number of resistance heating elements 17, preferably in the form of self-sustaining, molded and heat-hardened rod-shaped bodies, are disposed in the furnace chamber with the terminals of the resistance elements projecting into the apertures 16. The terminal portions of the heating elements 17 which extend into the aperture 16 in the furnace walls are preferably more highly conductive and, hence, become less highly heated than the body portion of the element 17. The ends of the heating element 17 are disposed in operative mechanical and electrical engagement with terminal mountings, shown here as comprising short rods or pieces 18 of heat-resistant electrically conductive material, preferably of Monel metal or an iron-chromium or iron-nickel-chromium alloy, such as ascoloy, the inner ends of these terminal pieces 18 being provided with recesses 19 containing granular heat-resistant and electrically conductive material which is substantially non-oxidizable at relatively high temperatures, grains of silicon being a desirable material. This granular conductive material, indicated at 20, is preferably packed fairly tightly within the recess under normal operating conditions; and the terminal pieces 18 are preferably maintained in operative position substantially spaced from the walls of the aperture 16 in the wall of the furnace chamber with the outer ends of these pieces projecting into the air-spaces 15.

At the right in Fig. 1, the terminal piece 18 is mounted upon the upper end of a flexible and resiliently yielding heat-resistant and electrically conductive element 21, preferably of Monel metal, the other end of the element 21 being connected to and supported by a bus bar 22 mounted on the furnace wall. At the left in Fig. 1, the terminal piece 18 is connected to and supported at an intermediate point of a conductive strap spring member 23 of the same material as the element 21 and mechanically and electrically connected to and supported by one or more bus bars at its ends, or otherwise supported and connected to a supply line.

An inwardly projecting lip or flange 24, indicated at the left in Fig. 1, may be provided on the side walls of the furnace at the inner edge of the apertures 16, as by counterboring the outer portion of the aperture 16, for the purpose of protecting the terminal piece 18 to some extent from the high temperature prevailing in the body of the furnace chamber. Or a washer or ring of refractory material 25 may be placed over the terminal portion of the heating element 17 at a point within the recess 16 in the furnace wall, as indicated at the right in Fig. 1, this ring acting as a shield to protect the terminal piece 18 from the more intense heat of the furnace chamber. The inner edge of the portions of the terminal pieces 18 which constitute walls of the recesses 19 in which the granular conductive material 20 is disposed may be beveled or serrated, as indicated at 26, to afford more ready dissipation of the heat developed at the points of engagement between the ends of the heating element 17 and the terminal pieces.

The terminal pieces 18 are yieldingly maintained in operative relation to the terminal portions of the heating element 17, through the intermediary of the conductive granular material 20, through pressure exerted on the terminal pieces 18 by the resilient spring mounting 21 or 23, so as to cause the latter, or the granular contact material 20 therein, to forcibly and yieldingly maintain the element 17 in operative position in the furnace chamber, and with the terminal portions of the resistance element spaced from the walls of the aperture 16 in the side walls of the furnace, and to likewise maintain the desired yielding butt-end electrical engagement between the end of the heating element and the granular conducting material 20.

Figure 2:
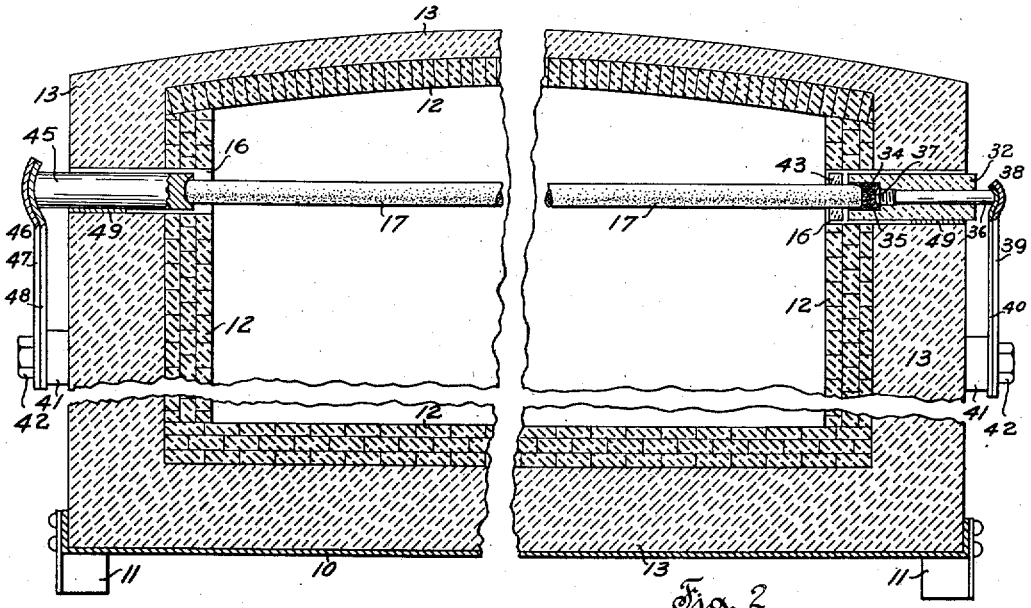
Figs. 2, 3 and 4 are views similar to Fig. 1 showing modified forms and additional details of the invention disclosed in Fig. 1.

In accordance with the disclosure of Fig. 2, the furnace includes a refractory liner 12, of brick or the like, and a covering of heat insulating material 13. The form of terminal support and mounting for the resistance element 17, preferably of the general character of that of Fig. 1, used on the furnace wall at the right in Fig. 2 includes a tube 32 of refractory insulating material, such as lava, having a relatively easy sliding fit in the aperture 16 through the wall of the furnace. The outer end of the tube 32 may extend slightly beyond the outer surface of the furnace wall, as indicated. The inner end of this refractory tube 32 is counterbored to provide a central recess 34 in which is disposed a granular, heat-resistant and conductive material of a not readily oxidizable nature, such as Monel metal, capable of maintaining itself at relatively high temperatures, this granular material being indicated at 35. As indicated, the end of the resistance heating element is in electrical engagement with the granular material 35. Passing through the axial bore of the lava tube is an electrically conductive bolt or rod 36 of Monel metal or the like heat resistant, conductive material, with its head 37 disposed in the recess 34 and its outer end extending appreciably beyond the outer end of the tube 32, this rod 36 being slightly enlarged and threaded adjacent its head into the tube 32.

Connection to a line terminal is made through the projecting portion of the conductive rod 36 and a yielding terminal mounting 38, here shown as comprising a spring or resilient supporting strip or element 39 and a relatively conductive strip 40 secured by welding, riveting or the like, to the inner face of the resilient supporting strip 39 and provided at its upper end with a concave recess or pocket within which the outer convex end of the conductive rod 36 engages. The end portion of the supporting element 39 may have the same concave formation as the contact strip 40, these end portions of the two strips being so formed as to be nested together. The terminal mounting element 38 is held in operative position, wherein it forcibly but yieldingly engages the end of the rod 36, by securing the lower end of the element 38 upon a support 41, preferably the bus-bar which supplies current to the terminal, suitably carried by the wall of the furnace, one or more bolts or screws 42 being here shown as a means for mechanically securing the terminal mounting in position on and insuring electrical connection thereof to the bus-bar 41.

The resilient mounting element made up of the strips 39 and 40 may be replaced by a single relatively stiff terminal spring, of Monel metal or the like heat resistant conductive material, with its upper end suitably shaped.

Disposed in the inner part of the aperture 16 is a ring 43 of refractory insulating material arranged in the general manner of the refractory ring 25 of Fig. 1, this refractory ring 43 serving to protect the conductive terminal of the heating element and the granular conductive material 35 and conductive rod 36 from the more intense heat of the furnace chamber.

It will be apparent that, during normal operation of a furnace equipped with the terminal connection and mounting described, the resilient mounting element 38 yieldingly urges inwardly the bolt 36 and the refractory tube 32 with the granular conductive material 35 at the inner end thereof, so as to force and maintain the granular conductive material in intimate mechanical and electrical engagement with the butt-end of the terminal portion of the heating element 17. This forcible engagement may be such as to maintain the resistance element in desired operative position within the furnace with its electrical connection to a supply line established and maintained in a satisfactory manner.

The form of terminal connection and mounting disclosed at the left in Fig. 2 includes the terminal portion of the resistance heating element 17 extending an appreciable distance into the aperture 16 so as to bring the end of the heating element 17 into a zone of relatively reduced temperature in the furnace wall. A terminal piece or rod 45, of electrically conductive and heat resistant material, preferably of Monel metal or iron-chromium or iron-chromium-nickel mixture, such as ascoloy, has its inner end formed concave or recessed for effective engagement with a square or slightly rounded end of the heating element 17. The recess at the inner end of the terminal piece 45 is preferably of substantially conical shape so as to insure provision of at least multipoint or substantially line contact between the same and the end of the heating element. As indicated, the terminal piece 45 is appreciably smaller than the aperture 16, this condition insuring appreciable spacing of the surface of the piece 45 from the walls of the aperture and promoting the transmission of heat from the point of engagement of such terminal piece with the end of the heating element.

The terminal piece 45 is maintained in operative position, both mechanically and electrically, with its outer end appreciably beyond the furnace wall where it may be maintained fairly cool, through engagement of a convex outer end thereof by a correspondingly concave or recessed portion of the terminal mounting 46, this terminal mounting comprising an outer resilient supporting element 47 and an inner contact strip 48, the general design of this terminal mounting and the means for supporting it in operative position and connecting it to a supply line being substantially the same as indicated at the right in Fig. 2. The design and arrangement of the terminal mounting 46 is such as to yieldingly engage the terminal piece 45 and force the same into efficient mechanical and electrical engagement with the end of the heating element 17 so as to form the desired electrical contact therewith and to effectively support the heating element with its body portion in the furnace chamber and its terminal portions spaced from the walls of the recess through the furnace wall.

It is desirable that the refractory tube 32 at the right and the terminal piece 45 at the left in Fig. 2 be spaced to an appreciable extent from the furnace walls about the aperture 16 for the purpose of facilitating the maintenance of these parts and the conductive parts associated therewith at satisfactory working temperatures. These parts 32 and 45 may rest directly on the wall about the aperture 16, or they may rest on a supporting or spacing projection or ledge 49 at the lower side wall of the aperture 16, the effect of this latter method of supporting the parts being to permit more ready circulation of air currents about and hence more ready heat dissipation from the parts 32 and 45.

Figure 3:
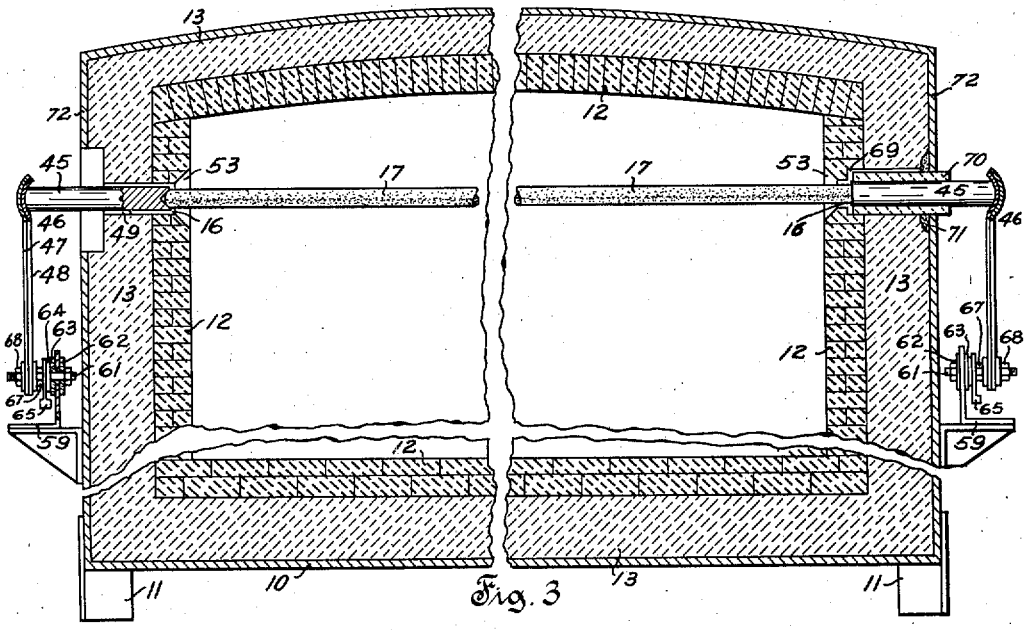

In Fig. 3, there is disclosed a furnace of substantially the same general construction as in Fig. 2, with its refractory lining 12, of brick or the like, and its covering of heat insulating material, indicated at 13. The side walls of the furnace chamber are shown as provided with aligned through apertures 16 at a point adjacent the dome-shaped roof, the inner ends of these apertures being cut away or beveled for a small distance from the inner wall of the chamber to form a substantially conical recess at such point, as indicated at 53, the angle of flare being preferably 90° or between the latter value and 45°. The heating element 17 extending across the furnace chamber has its ends, preferably of the more highly conductive type as described hereinabove, extending to a slight extent within the unflared portions of the apertures 16. The terminal pieces 45 of the type and characteristics of the corresponding element of Fig. 2, are disposed in the apertures 16, with the inner ends normally positioned a slight distance within the wall beyond the end of the flared portion 53, and the outer end projecting considerably beyond the furnace wall, as indicated, exceptionally good results being secured with an iron-chromium-nickel alloy, such as ascoloy. These terminal pieces are somewhat smaller than the apertures 16, so as to provide an air space between the terminal pieces and the surrounding wall of the apertures, thus permitting more ready heat transmission outwardly along the terminal pieces, a seating and spacing projection 49 being provided on the wall at the lower side of the aperture 16, if desired. The inner ends of these terminal pieces 45 are provided with conical recesses within which the appreciably rounded ends of the heating element 17 engage.

The terminal pieces 45 are maintained in operative position and in desired electrical and mechanical engagement with the ends of resistance heating element 17 by means of flexible and resilient terminal mounting elements 46 of the general character of that described in connection with Fig. 2. Desirable results are secured when both the resilient supporting strip 47 and the associated contact strip 48 are of a heat resistant, conducting metal like Monel metal; and this terminal element may likewise be formed of a single resilient strip of this metal. This terminal mounting may have a bent portion to increase the flexibility and resilience in the direction of the longitudinal axis of the terminal piece 45. As indicated, the terminal element 46 may be mounted upon an angle-iron or other correspondingly shaped support 59 secured to the furnace wall or supporting frame. A bolt 61 extends through an aperture in the vertically extending portion of the support 59, the head of the bolt or a holding nut thereon being at the inner side of support, with an insulating washer 62 between such bolt head or nut and the support and having a bushing extending through the support. This bolt 61 is secured in operative position by means of a nut on the bolt, with an insulating bearing washer between this nut and the angle iron, the washer being indicated at 63 and the nut 64. A line terminal 65, in the form of a terminal washer, is secured in position on the bolt 61 between the nut 64 and a securing nut 67. The outer end of the bolt 61 passes through apertures in the lower end of the terminal mounting 46, the latter being secured in mechanically and electrically operative position by a nut 68, with suitable metal bearing washers between element 46 and the nuts 67 and 68.

As indicated at the right in Fig. 3, the outer portion of the aperture through the wall of the furnace chamber is enlarged, as indicated at 69, and a refractory insulating tube 70, of material such as alundum, is inserted in the enlarged aperture. The enlargement of the aperture and the refractory tube 70 therein extend inwardly almost to the beginning of the flared portion 53. The bore of the tube 70 is preferably substantially the same as the diameter of aperture 16 and is such as to receive the terminal piece 45 with a loose fit, thus providing a slight air space substantially wholly around the terminal piece, the inner end of the latter being located substantially or nearly at the inner end of the refractory tube 70. This tube 70 preferably extends appreciably outside the furnace wall and has a loose fit in the enlarged aperture 69; and the tube may well be of substantially square outer cross-sectional shape and fitting in the enlarged aperture 69 of circular cross-section, thus providing a substantial air space between tube and the surrounding wall of the aperture. The general arrangement is such as to provide for dissipating heat from interior portions of the terminal piece 45 and associated parts, thus better insuring the maintenance of these parts at safe operating temperatures. One or more masses of mortar or other hardening plastic, indicated at 71, may be set in recesses in the wall of the furnace to hold the tube 70 in position, without substantially closing off the air-space about this tube.

An outer protective covering 72 of sheet metal may be provided about all or a portion of the walls of the furnace chamber.

It will be apparent that, with the flexible and resilient terminal mounting elements 46 of the required stiffness and strength, the concave contact portions of these terminal mounting elements forcibly and yieldingly engage the convex outer ends of the terminal pieces 45, thus yieldingly urging the latter into efficient engagement with the ends of the heating element 17, these ends being in contact with the walls of the conical recesses in the inner ends of these terminal pieces. Through this arrangement, the heating element is efficiently maintained in operative position within the furnace and electrically connected to a supply line through pressure exerted on the heating element in the direction of its longitudinal axis; and this support of the heating element is of such a yielding nature as to insure efficient electrical connection between the cooperative parts even through the maximum variation in temperatures during operating conditions.

Figure 4:
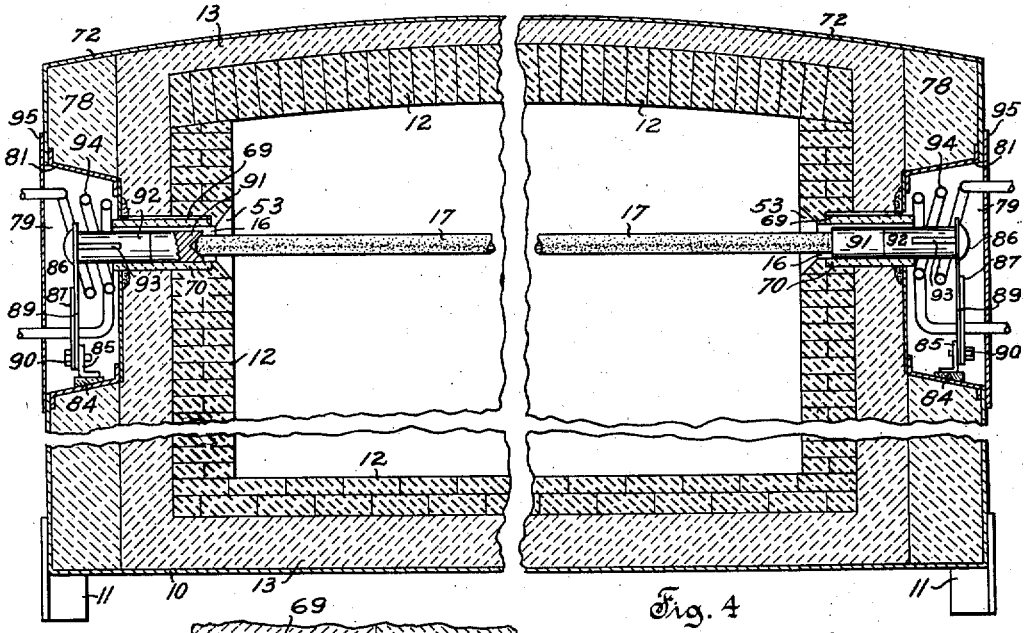

In accordance with the disclosure of Fig. 4, the furnace chamber may be considered as of substantially the same general construction as in Fig. 3, with the exception that additional external side wall portions 78 of heat insulating material are provided, these wall portions being recessed about the outer terminal apertures so as to form chambers 79 which may be lined with a metal terminal box or casing structure 81, the latter cooperating with the sheet metal shell 72 to fully enclose the furnace walls. Upon an insulating support 84 carried by the casing 81, an angle-iron or like conductive support 85 is mounted, the same serving as a terminal connection to a supply line. A resilient and flexible terminal mounting element 86 is carried by this conductive support 85 and comprises a flexible and resilient leaf or strip or heat-resistant, conductive material, such as Monel metal, and one or more resilient and relatively stiff reinforcing leaves or strips, likewise preferably of Monel metal or the like. The several leaves or strips of the resilient mounting element 86, the reinforcing strip being indicated at 87 and the contact strip at 89, may be permanently connected together; and the element as a whole is mechanically secured in operative position and electrically connected in circuit by one or more bolts or screws 90, at least the inner one of these strips having a suitable recessed upper end for engagement with the convex terminal portion of a terminal piece 91, 92 disposed within the refractory tube 70, mounted in the enlarged outer portion 69 of the aperture 16, with the outer end extending considerably beyond the end of the tube 70.

Instead of the ordinary form of terminal piece within the refractory tube 70, as shown in Fig. 3, the terminal piece may comprise an inner portion of highly heat-resistant and conductive material, preferably an iron-chromium-nickel alloy, such as ascoloy, this inner portion being exposed to the more intense heat arising from the most active portion of the heating element in the furnace chamber, and an outer portion 92 of brass or other suitable metal which is relatively inexpensive and of higher electrical and heat conductivity than the inner portion 91. The two or more portions of the terminal piece supported within the refractory tube 70 may be separate and formed with suitable abutting end engagement surfaces, either plane, rounded or generally telescoping; or these pieces may with preference be integrally united by screw threads, brazing or intimately connected in a permanent and self-supporting fashion; and the outer end of the portion 92 is preferably corrugated or slotted to increase its surface area and thus improve its heat-dissipating properties for the purpose of better insuring a safe operating temperature at the point of engagement between this outer end of the portion 92 and the terminal mounting element 86. For this purpose, the outer end of the portion 92 is shown as provided with a plurality of diametral slits 93. With the arrangement disclosed herein, use may be made of material having relatively high heat-resistant properties such as an iron-chromium nickel alloy, which is relatively expensive, for the element in direct engagement with the end of the heating element 17, and of other material of satisfactory and suitable heat and electrically conductive properties, such as brass or the like, which is a relatively less expensive material, to the final end of providing an efficient and relatively inexpensive terminal and mounting arrangement which has the desired operating characteristics.

As a further means for assisting in maintaining the conductive terminal and mounting elements in relatively cool operating condition, a coil 94 through which water or other cooling fluid passes, may be disposed within the terminal casing 81, and preferably surrounding the outer end of the terminal piece 92, with inlet and outlet conduits passing through slots in a renewable sealing cover plate 95.

With the terminal mounting elements 86 of the required stiffness and resiliency, the heating element 17 is held, through the intermediary of the terminal pieces 91, 92, in mechanically and electrically operative position in a yielding and readily detachable manner and through butt-end engagement of the heating element with cooperative parts.

Figure 5:
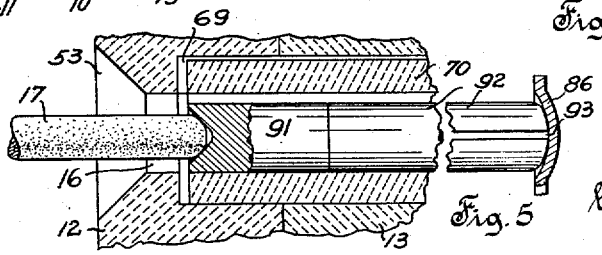
Fig. 5 is an enlarged, fragmental, vertical section of a detail of the apparatus shown in Fig. 4.

As indicated in Figs. 3, 4 and 5, the aperture 16 with its inner flared portion 53 and the counterbore or enlarged portion 69 may, for convenience in manufacture and assembly, all be formed in a single brick or refractory lining element by molding to the desired special conformation. Likewise, this specially formed brick or lining element may be of extended length so as to extend through the insulating wall covering 13, thus permitting ready removal and renewal of this specially shaped element, designated as 12ª in Figs. 7 and 8. The importance of having the refractory parts immediately surrounding the resistor 17 and its contact 91 so constructed as to be readily replaceable without major disturbance of the furnace wall structure is due to the fact that on long continued on-and-off operation the face of the metal contact adjoining the resistor tends to become locally fused and oxidized to an extent which sometimes causes it to adhere so tightly to the adjacent refractories as to interfere with proper operation of the spring actuated contact. On such occasions it frequently becomes necessary to tear out the refractory as well as the metal contact in order to make repairs, and it is obviously desirable that such tearing out involve minimum damage to the furnace structure.

Figure 6:
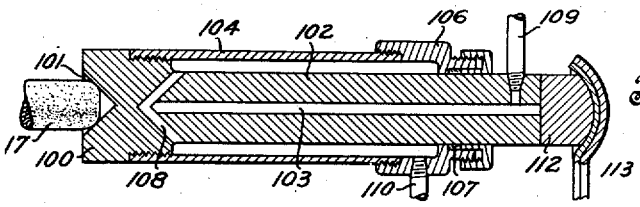
Fig. 6 is a vertical sectional view of a modified form of a terminal mounting detail.

In Fig. 6, there is disclosed a modified form of terminal mounting arrangement utilizing, as a substitute for the terminal piece 45 or 91, 92, a fluid-cooled terminal piece 100, using water, air or the like as the cooling medium, which assists in maintaining satisfactory reduced temperatures of the parts of the terminal mounting during normal operation at extremely high furnace temperatures. The inner end of the element 100 has a conically recessed portion, indicated at 101, for engagement with the end of the heating element 17. The outer portion of the terminal is or has portions of reduced diameter, as indicated at 102, and has a central bore 103. A sleeve 104 is attached to the inner or body portion of the terminal piece, as by screw-threads, and surrounds the reduced portion 102 leaving an annular chamber or a plurality of chambers between these parts. The outer end of the sleeve 104 may be closed by an apertured cap 106 through which the reduced portion 102 passes, the cap being threaded on the end of the sleeve and provided with a stuffing-box 107 and suitable packing to effectively seal the aperture about the reduced portion 102. The bore 103 communicates at its inner end, through radial ports 108, with the chamber or chambers within the sleeve 104, and near its outer end with a supply conduit 109 for cooling fluid. The space within the sleeve 104 communicates, as through an aperture in the cap 106, with a discharge conduit 110 for the fluid used for cooling purposes. The outer end of the bore 103 may be closed in any suitable manner, as by having a terminal head welded or otherwise secured on the outer end of the reduced portion 102 so as to seal the outer end of the bore 103, this terminal being of convex or other desired shape for effective mechanical and electrical engagement by a resilient terminal element 113 of the character described hereinabove. The conduits 109 and 110 are preferably of insulating material or are insulated from the parts of the conductive terminal piece. These conduits may be connected to the terminals of the cooling coil 94 or other suitable sources. The terminal piece may be divided at any desired point of the reduced portion 102 into an inner highly heat resistant portion and an outer more readily workable and conductive portion, the two portions being preferably welded to prevent leakage from the bore 103.

Figure 7:
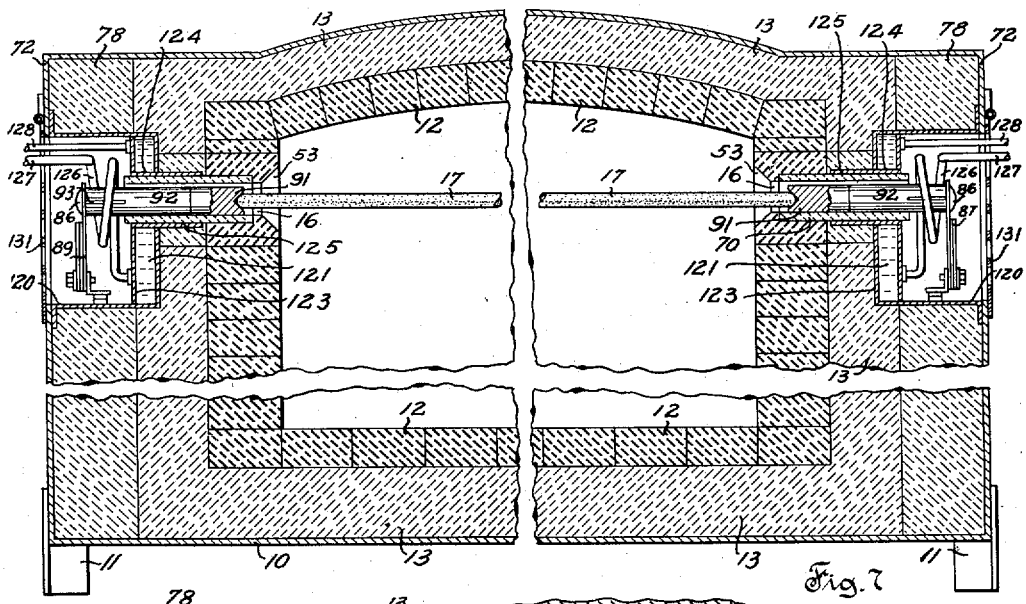
Fig. 7 is a view similar to Figs. 1, 2, 3 and 4, showing a further modified form of the invention.
Figure 8:
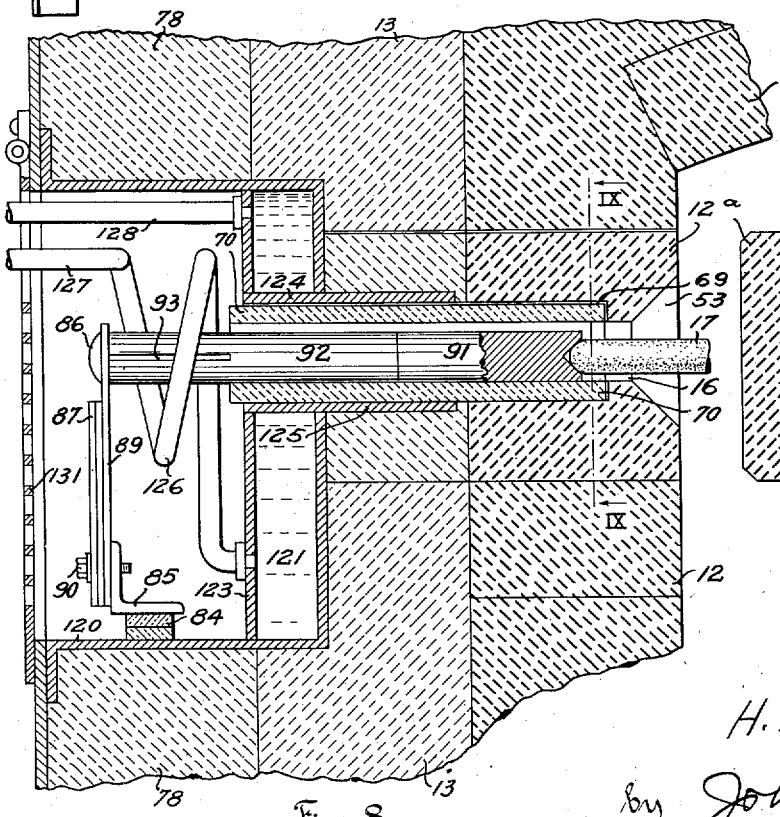
Fig. 8 is an enlarged, fragmental, vertical section of a detail of the apparatus shown in Fig. 7.
Figure 9:
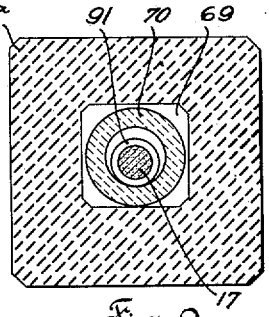
Fig. 9 is a vertical sectional view in the plane of the line IX—IX of Fig. 8.

In the modified construction disclosed in Figs. 7, 8 and 9, the furnace wall construction is slightly modified to accommodate a terminal casing 120 which has incorporated therein or associated therewith a metallic water or other fluid cooling jacket 121, the specific construction shown herein including the formation of the water jacket at the inner end of the casing 120, the inner end wall of the latter forming one side wall of the jacket and a partition 123 welded, or otherwise secured in a fluid-tight manner, to the walls of the casing forming the front wall of the jacket. The partition 123 and the inner end wall of the casing are eccentrically apertured in line with the aperture 16 and its counter-bore 69, and a tube or sleeve 124 is welded, or otherwise secured in a fluid-tight manner, to the partition 123 and the inner end wall of the casing, the tube 124 being of such interior diameter as to fit fairly closely about the refractory tube 70 and completing the water jacket about the latter and the terminal piece 92 therein. The metal of the central tubular wall 124 of the water jacket is extended inwardly to a considerable distance into the wall of the furnace chamber, being here shown as projecting nearly or substantially to the refractory lining 12. A cooling coil 126 is utilized as a part of the inlet connection 127 to the lower part of the water jacket, the turns of the coil being suitably spaced from the terminal piece 92 and the resilient terminal mounting 86 so as not to interfere with the removal or replacement of the conductive terminal parts. As indicated, the discharge from the water jacket is through a conduit 128 connected to the jacket near its uppermost point. These conduits are preferably detachably connected, either inside or immediately outside the terminal casing to suitable supply and discharge means. A door or cover plate 131 is mounted, as by hinging at its upper side, outside and serves to close the terminal casing 120 and to protect the apparatus therein. This cover plate is shown as provided with ventilating openings, through an elongated one of which the conduits 127 and 128 or connections therefrom project. Shutters may be provided to close off the openings in the cover plate, if it is desired to confine the space within the casing from the surrounding atmosphere.

Through the use of the water-jacket 121 with the inwardly extending projection 125 from the inner tubular wall of the jacket, heat from the inner tubular wall of the jacket, heat from the inner portions of the refractory tube 70 is transmitted directly to the metal tubular extension and more readily carried to the water cooled portion of the jacket, the arrangement thus serving to more readily dissipate heat from the terminal piece 91, 92 and maintain the same and more especially its terminal portions in satisfactory operating condition.

As indicated, a single brick or lining element 12ª may be formed to provide the apertures or recesses 16, 53 and 69, and this specially formed element may be of such length as to extend outwardly through the insulating wall covering 13 into substantial engagement with the terminal casing 120 or the water jacket 121, such specially formed element being further recessed to provide a suitable space for the extension 125 of the inner wall of the water jacket. The tube 70 may be made of a highly refractory material which will withstand great differences of temperature. As indicated in Figure 9, the tube is loosely mounted in the aperture 69 so that the tube is easily replaceable. In Figure 8 the block 12ª is shown as slightly separated from the brick work above it. It is desirable that this block should also be easily replaceable.

The form of yielding terminal mounting for applying the required butt-end pressure upon the terminals of the heating element 17, as disclosed herein, wherein the required electrical and mechanical engagement is secured through a contact portion located near the end of a flexible supporting arm, permits ready removal of the heating element and associated contact parts within the aperture 16 in the furnace wall; for after releasing the holding screw or bolt which secures the supporting arm, with a little pressure applied to such arm, it may be readily freed from the end of the terminal piece directly associated with the heating element, and then the supporting arm may readily be swung about its securing bolt to a position wherein it does not interfere with removal of the heating element and contact parts from the aperture 16. When the parts are renewed or reassembled, the yielding supporting terminal or mounting may be readily swung back to and secured in operative position.

While in the several furnaces disclosed, yielding and resilient terminal mountings are shown as being provided for both ends of the heating element 17, one of these yielding terminal mountings may be replaced by a bar or pad of conductive material held more or less rigidly in position and provided with a recessed portion in or with which the convex end of the terminal piece disposed in the aperture 16 engages, the required yielding effect being secured wholly through the terminal mounting for the other end of the heating element, this latter terminal mounting being of the ordinary yielding type described. Likewise, two yielding terminal mountings of the same or different ones of the several types described herein may be used for supporting a heating element 17 in operative position.

The resistance heating element 17 is preferably of a molded and heat-hardened composition type and of a carbonaceous character and preferably contains a carbide, such as silicon carbide, as an essential constituent, the resultant heating element being rigid and self-sustaining and readily handled. The resistance element is preferably of substantially the same cross-sectional area throughout, both the active body portion and the terminal portions, and its terminal portions are of increased conductivity, preferably rendered so through treatment which alters both mechanical and electrical characteristics of interior and surface parts of the terminal portions during the manufacture of the resistance element. The manufacturing operations ordinarily leave the extreme ends of the terminals, or portions thereof, of such a resistance element somewhat rounded, and these ends of the resistance element and the associated elements of the terminal mountings are intended to be in butt-end engagement during normal operation, being yieldingly maintained in the desired contact relation by the resiliency and normal bias of the yielding mounting element, the contact portion of which is movable about its point of support due to the spring effect of a portion of the mounting. Capability of movement of this contact portion of the mounting may be secured in other manners, such as pivoting the mounting element at its point of support or otherwise guiding the contact portion for substantially straight line movement along the axis of the heating element. The normal biasing of the contact portion to secure the desired movement thereof may likewise be secured by other forms of springs, gravity, and the like.

Even in those cases where the end of the resistance element is of such contour that electrical engagement and mechanical support of such element are initially secured only at one or more spaced points of the resistance element and the cooperative recessed contact member, the heat produced at such restricted contact area during initial operation may be such as soon causes softening or melting of the metal of the contact strip or element and permits the latter to adjust or wear itself into more secure and extended electrical and mechanical engagement with the end of the heating element, the final result being that effective contact is secured in a relatively short time over a sufficient number of points or an area of such size as to produce satisfactory and efficient operation of the heating element at the desired high temperatures. Certain desirable effects of heating appliances embodying preferred forms of the present invention may be due to the ability of the conductive materials used for the contact portions of the terminal mountings to wholly or substantially withstand or prevent the formation of oxides of the metal at the heated contact surfaces, even when the latter are heated to a relatively high temperature, or to the fact that, if oxides are produced at these surface portions of the metallic terminals, the oxide film produced is relatively thin and, while it may be sufficient to exclude air and prevent further or increased formation of oxide or scaling nevertheless, it is sufficiently thin so that the potential drop across the same is relatively inappreciable and remains practically constant once the desired normal operating engagement is established between these parts. Possibly, both of the above effects are ordinarily present to a greater or less extent.

Where very high temperatures are liable to be present, it has been found that Monel metal and iron-chromium or iron-chromium-nickel alloys, preferably the alloy known as ascoloy, give especially desirable operating results, the effect in the latter case being more in the nature of an absence of deleterious formation or oxide or pitting on the metallic surface in engagement with the end of the heating element.

Desirable results may be secured by providing the required metallic contact elements of the terminal mounting with a coating of finely divided conductive particles of heat-resistant and electrically conductive material, such as Monel metal, sprayed on the contact elements, preferably under high pressure, and after thoroughly cleaning, as by sand-blasting. Likewise, desirable results may be secured by depositing a like sprayed metal coating on the extreme end of the resistance element. This thin sprayed coating may be particularly desirable in establishing a satisfactory initial electrical engagement between the parts and in quickly establishing the desired normal operating condition of the contacting parts.

The heating chamber described herein as a furnace may be any of the ordinary types of furnaces known in the art, such as melting furnaces for metals, glass and other materials, or strictly heat treating furnaces, of the open, muffle or other types, for treating fully or partially manufactured articles, or furnaces or chambers for maintaining melted or other materials at a particular high temperature. And the heating elements may well be mounted in any position other than the horizontal position shown.

Resistance heating elements of the character described are capable of producing and maintaining themselves, during a commercially satisfactory like, under furnace temperatures upwards of 2,400° Fahr., and even up to and beyond 3,000° Fahr., and these heating elements remain as self-sustaining elements at these temperatures without the necessity of embedding any portion of the heating element in the furnace wall or otherwise providing any support other than that afforded by the butt-end engagement thereof with the terminal pieces and yielding mountings described herein. Through the use of a resistance heating element and terminal mountings for supporting the heating element in operative position in the furnace chamber and electrically connecting the element in circuit, as described herein, the heating elements may be maintained out of direct contact with any portion of the furnace wall and the contact points may be maintained at sufficiently reduced temperatures to insure satisfactory operation, even though the furnace temperature may be sufficient to destroy the metals used for the terminal mountings and supports. And with the form of terminal mounting described, the heating elements and terminal pieces may readily be removed and replaced through the furnace wall with little delay or less of production of the furnace, and where a sufficient number of bars are installed in the furnace, without shutting down the furnace at all.

By "yielding" or "resilient" in connection with the mechanical support of the heating element or its electrical engagement by a terminal member, it is intended to convey the idea that there is, in addition to the exertion of required pressure against or on the heating element, capability of the terminal or mounting parts of automatically yielding or responding, as for the purpose of permitting any expansion or adjustment of the heating element or associated parts incident to operating conditions. And by "self-sustaining", it is intended to convey the idea that the heating element is of such unitary and rigid construction that it is self-supporting as for instance, it will maintain or sustain itself when supported only at its ends.

It should be understood that the invention set forth herein is not limited to the specific details of construction and operation described; but it is desired that the claims cover the ordinary and obvious modifications that may occur to persons skilled in the art.

It is claimed and desired to secure by Letters Patent:

1. In combination in an electrical furnace, a furnace chamber having its wall recessed, a self-sustaining electrical resistance heating element having terminal portions thereof extending into the furnace wall, and means for resiliently supporting said heating element in operative position within said furnace, said means comprising resilient terminals and intermediate bar-shaped elements of electrically conductive and heat-resistant material disposed in said recesses of the furnace wall and interposed between said terminals and the terminal portions of said resistance element and supporting said resistance element in operative position wholly through pressure exerted in the direction of the longitudinal axis of the resistance element.

2. In combination in an electrical furnace, a furnace chamber having its wall recessed, a unitary self sustaining electrical resistance heating element in the form of a heat-hardened composition product having integral terminal portions thereof of increased conductivity one of which extends into a recess in the furnace wall, and means for yieldingly supporting said resistance element in operative position within said furnace and in electrical connection with a line circuit, said means comprising a yieldable conductive terminal element, and an intermediate bar-shaped terminal element disposed in said recess in the furnace wall and interposed between said yieldable terminal and the conductive end of said heating element, said intermediate element being of material more highly heat-resistant than said terminal element and provided with a recess at its inner end within which the conductive terminal of said heating element is yieldingly held in electrical and mechanical engagement.

3. In combination in an electrical furnace, a furnace chamber comprising spaced walls provided with through apertures, a unitary self-sustaining electrical resistance heating element disposed within said furnace and having integral terminal portions thereof extending into the apertures in said spaced walls, and terminal mountings for said heating element including yieldable current carrying elements supported outside of said furnace wall and exerting pressure on the ends of the terminal portions of said heating element in the direction of its longitudinal axis, said mountings being operative to yieldingly maintain said heating element in operative position substantially free of the walls of said furnace chamber.

4. In combination in an electrical furnace, a furnace chamber comprising opposed walls provided with through apertures, a self-sustaining, rod-shaped electrical resistance heating element of a substantially non-metallic character and having terminal portions thereof of increased conductivity extending into apertures in said walls, and means for yieldingly supporting said heating element in operative position substantially wholly through pressure exerted in the direction of the longitudinal axis of said heating element, said means comprising metallic terminal pieces having their inner ends in said apertures, and a resilient conductive element supported outside one of said apertures and having a portion in contact with one of said terminal pieces.

5. In combination in an electrical furnace, a furnace chamber comprising opposed walls provided with alined apertures, a self-sustaining, electrical resistance heating element in said chamber and having its ends projecting into said apertures, and means for yieldingly supporting said resistance element in operative position and in electrical connection with a supply circuit, said means comprising flexible and resilient conductive elements supported outside of said furnace walls, and intermediate conductive elements within said apertures and having portions of different heat-resistant qualities with the more highly heat-resistant portions in electrical and mechanical engagement with the terminals of said resistance elements.

6. In combination in an electrical furnace, a furnace chamber comprising side walls provided with a lined apertures, the walls of said apertures being counterbored at the outer end thereof and being outwardly flared at the inner end thereof, a refractoy tube disposed in the counterbored portion of said walls, a self-sustaining, electrical resistance heating element of rod-shape and of substantially the same cross-sectional area throughout, said heating element having terminal portions of increased conductivity extending into said refractory tube, and means for yieldingly supporting said heating element in operative position within said furnace, said means comprising yieldable terminal elements supported in position outside of said furnace walls, and intermediate terminal pieces of heat-resistant material disposed within said refractory tubes and having substantially cone-shaped recesses at their inner ends within which said extreme ends of said heating element engage.

7. In combination in an electrical furnace, a furnace chamber having walls provided with through apertures in alinement, a self-sustaining electrical resistance heating element within said furnace and having terminal portions extending into said apertures, and means for yieldingly supporting said resistance element in operative position in said furnace and in electrical connection with a line circuit, said means comprising a terminal supported outside of said furnace wall, and an intermediate electrically conductive and heat-resistant element containing a substantial amount of chromium interposed between the end of said resistance element and said terminal, said terminal having associated therewith means for yieldingly supporting said resistance element and said intermediate element in operative position and connected to a line circuit wholly through butt-end pressure exerted on the parts in the direction of the axis of the heating element.

8. In combination in an electrical furnace, a furnace chamber having side walls provided with alined through apertures, a self-sustaining electrical resistance heating element of a substantially non-metallic character disposed in said furnace chamber and having terminal portions of increased conductivity extending into apertures in the furnace walls, a terminal casing on the outside of the furnace wall and apertured in alinement with the aperture in the furnace wall, a yieldable conductive terminal supported within said terminal casing, an intermediate conductive and heat-resistant element interposed between the terminal portion of said resistance element and said terminal, said terminal being yieldingly urged in the direction of the longitudinal axis of said resistance element and operative to mechanically and electrically maintain said resistance element in operative position through butt-end engagement between the terminal, the intermediate element and the resistance element.

9. In combination in an electrical furnace, a furnace chamber having side walls provided with alined through apertures having portions of polygonal cross-sectional outline, a refractory tube disposed within a portion of an aperture of polygonal cross-sectional outline in said furnace wall, said refractory tube being of substantially cylindrical form and fitting loosely within said polygonal aperture, a self-sustaining heating element of a non-metallic character disposed in said furnace and having terminal portions of increased conductivity, a terminal casing on the outside of the furnace wall and apertured in alinement with the aperture in the furnace wall, said refractory tube extending outwardly beyond said furnace wall and into the said terminal box, and means for mounting and maintaining said heating element in mechanically and electrically operative position through yielding butt-end engagement with said heating element.

10. In an electrical furnace, a furnace chamber having apertured walls, a self-sustaining resistance heating element having a heat-producing body portion within said furnace chamber and a terminal portion of increased conductivity disposed within an aperture in a wall of said chamber, a refractory tube within said aperture and spaced at points from the walls of said aperture and surrounding said terminal portion of the heating element, and means for supporting said heating element in operative position and connecting the same to a supply circuit, said means comprising a terminal piece of heat-resistance conductive metal having its inner portion within said refractory tube, and means for yieldingly urging said terminal piece into butt-end supporting and electrical engagement with said terminal portion of the heating element.

11. In an electrical furnace, a furnace chamber having apertured walls, a self-sustaining resistance heating element having a heat-producing body portion within said furnace chamber and a terminal portion of increased conductivity disposed within an aperture in a wall of said chamber, a refractory tube within said aperture and spaced at points from the walls of said aperture and surrounding said terminal portion of the heating element, and means for supporting said heating element in operative position and connecting the same to a supply circuit, said means comprising a terminal piece of heat-resistant conductive metal having its inner portion within said refractory tube, and means for yieldingly urging said terminal piece into butt-end supporting and electrical engagement with said terminal portion of the heating element, and a cooling jacket carried by the wall of the furnace and having an inner tubular wall surrounding and closely adjacent said refractory tube.

12. In an electrical furnace, a furnace chamber having apertured walls, a self-sustaining resistance heating element having a heat-producing body portion within said furnace chamber and a terminal portion of increased conductivity disposed within an aperture in a wall of said chamber, a refractory tube within said aperture and spaced at points from the walls of said aperture and surrounding said terminal portion of the heating element, and means for supporting said heating element in operative position and connecting the same to a supply circuit, said means comprising a terminal piece of heat-resistant conductive metal having its inner end recessed and disposed within said refractory tube, and means for yieldingly maintaining said terminal piece in forcible engagement with the end of said terminal portion in the recess of said terminal piece, and a cooling jacket carried by the wall of the furnace and having an inner tubular wall surrounding and closely adjacent said refractory tube.

13. In an electrical furnace, a chamber having a wall including an element of refractory material provided with a through aperture having an enlargement at the point where it opens into the furnace chamber, a unitary self-sustaining resistance heating element disposed within said furnace chamber and having an integral terminal portion thereof extending into the aperture of said refractory element beyond the enlargement of said aperture, and a conductive terminal element within said aperture maintained in operative engagement with the end of said heating element.

14. In an electrical furnace in combination, an enclosed chamber, apertures in the walls of the chamber, silicon carbide resistor rods which may be inserted through said apertures and which extend across the chamber into the apertures, metallic terminal elements in said apertures to mechanically support said resistor elements by butt-end engagement and to conduct the electric current outside of the walls of the chamber, and resilient terminal members having cup-shaped portions which support both the terminal elements and the resistor elements and conduct the electric current, said resilient members being so mounted on the outside of the furnace that by loosening a single bolt each may be rotated to permit insertion or withdrawal of the resistor element and terminal element.

15. In an electric furnace, an enclosed chamber having apertures through which a resistor element may be inserted, terminal elements to support said resistor element by butt-end engagement at points within the apertures but adjacent the openings of the apertures and to the chamber, said apertures being flared outwardly toward the interior of the muffle to provide for freer dissipation of the heat developed at the junction of the resistor element and the terminal elements.

16. In an electric furnace using rigid heating elements, a wall element adapted for the insertion and support of a heating element and its terminal connection, said wall element comprising a refractory block having an aperture therethrough and a refractory tube loosely supported in said aperture and extending only partially through the said aperture, said tube being of larger internal diameter than said heating element and its terminal contact piece.

17. In an electric furnace, a rigid self-supporting resistor, a furnace wall including an element adapted for the insertion and support of said resistor, said furnace wall element comprising a refractory block having an opening therethrough and a refractory tube loosely mounted in said aperture, said tube being of larger diameter than the resistor and its terminal support, and a terminal member extending into the said tube and engaging the end of the resistor within the said tube.

18. In an electric furnace, a heating chamber, a rigid resistor element extending across said chamber and supported from its ends, and a refractory block in one of said walls having an aperture extending therethrough, a refractory tube inserted within the said aperture, and a terminal member extending only partially through the said aperture and engaging the end of the resistor within the said aperture.

19. The furnace wall described in claim 18 in which the aperture in the refractory block is of larger diameter adjacent the heating chamber than at points in said aperture a little further removed from the heating chamber.

20. In an electric furnace wall, a support for a resistor rod and for a terminal connector thereof, said support comprising a refractory block to be inserted in a furnace wall, which block contains a passageway therethrough of sufficient diameter to permit passage of a resistor rod, the end of the passageway adjacent the hotter side of the furnace wall being of greater diameter than at points in the passageway a little further removed from the hotter side of the wall.

21. The electric furnace wall described in claim 20 in which the end of the refractory block remote from said enlarged aperture abuts a water-cooled chamber.

22. In an electric furnace wall, a support for a resistor rod and for a terminal connector thereof, said support comprising a refractory member surrounding the resistor and connector at their point of contact, said member being readily replaceable in the furnace wall.

23. In an electric furnace wall, a support for a resistor rod and for a terminal connector thereof, said support comprising a refractory block and a refractory sleeve adjacent said rod and connector, the block and the sleeve forming a slip fit therearound, the sleeve being a slip fit in said block and said block having a stop therein to prevent the sleeve from slipping into the furnace.

24. The wall element described in claim 16, in which the refractory tube is of the same internal diameter as a portion of the aperture in the block immediately adjacent the end of the tube.

25. In an electric furnace wall, a refractory block having an aperture therethrough, the said aperture having a flared portion, a middle portion of substantially constant cross section along its length, and a third portion also of substantially constant cross section and of larger cross section than the said middle portion, the said third portion of the aperture being adapted to receive a refractory tube of larger external diameter than the diameter of the said middle portion of the aperture.

26. In an electric furnace, a refractory block having an aperture therethrough for the reception of an end of a rigid resistor, a portion of the said aperture being of substantially uniform cross section along its length, a second portion also of substantially uniform cross section along its length and of larger diameter than the first mentioned portion, and a non-conducting refractory tube within the said second portion of the aperture and terminating within the aperture in the said block.

In testimony whereof I affix my signature.

HAROLD N. SHAW.